Aug. 26, 1952
L. N. BRUTUS
2,608,229
LOCK SCREW OR THE LIKE
Filed March 20, 1950
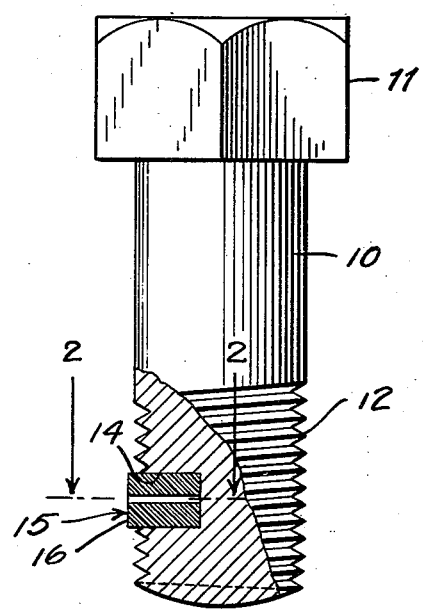
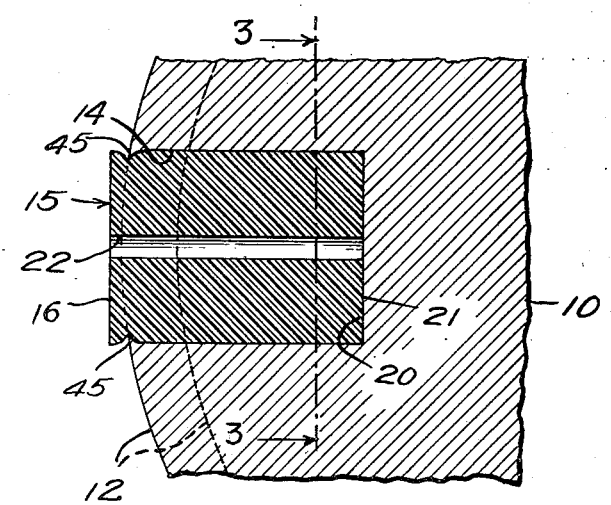
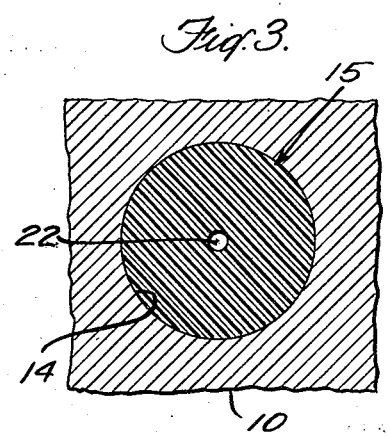
Inventor
LEE N. BRUTUS
By
Attorney Patented Aug. 26, 1952

2,608,229

UNITED STATES PATENT OFFICE 2,608,229

LOCK SCREW OR THE LIKE

Lee N. Brutus, Eaton, Ohio

Application March 20, 1950, Serial No. 150,755

3 Claims. (Cl. 151—7)

This invention relates to elements having machine screw threads thereon such as machine screws, bolts, studs, threaded rods, nuts, or the like, and has for an object to provide novel and improved lock means to prevent the element from turning.

Another object is to provide an improved locking device of the type above indicated which retains its effectiveness after long continued or repeated use.

Various other objects and advantages will be apparent as the nature of the invention is more fully disclosed.

This application is a continuation-in-part of my co-pending application Serial No. 757,563 filed June 27, 1947, for Lock Screw or The Like, now Patent No. 2,520,121.

Although the novel features which are characteristic of this invention are pointed out more particularly in the claims, the nature of the invention will be better understood by referring to the following description, taken in connection with the accompanying drawing, in which a specific embodiment thereof has been set forth for purposes of illustration.

In the drawing:

Fig. 1 is a side elevation, partly in section, of a bolt showing my improved locking device;

Fig. 2 is an enlarged detail view taken on line 2—2 of Fig. 1 showing one means for locking the insert to the threaded shank; and Fig. 3 is a section through the locking plug taken on the line 3—3 of Fig. 2.

In accordance with the present invention, I provide a small plug of a material which is capable of being deformed without taking a permanent set and which tends to return to its original shape gradually as distinguished from rubber like compositions which return to their original shape as soon as the deforming pressure is removed. This plug is inserted in one side of the threaded member in a position to bear against the engaged thread of the compression member. The plug has the characteristic of locking the shank against turning due to the friction produced by the plug itself against the engaged threads and also by the lateral displacement of the shank in the external thread due to the pressure exerted by the plug on one side of the threaded shank.

I have found that nylon is particularly suited for this purpose. Nylon has the property of tending to return to its original shape after being deformed. Hence it does not take a permanent set and may be repeatedly reused. A thread is pressed rather than cut into the surface of the nylon plug by the engaged thread and the tendency of the nylon plug to return to its original shape maintains a pressure against the engaged thread which produces a permanent locking effect. Such a locking device is effective after many repeated uses inasmuch as the surface of the plug returns to its original shape after each use.

Referring to the drawings more in detail, the invention is shown in Fig. 1 as applied to a bolt comprising a shank 10 and a head 11. The shank 10 is threaded throughout at least a portion of its length with a machine screw thread 12 which is adapted to enter a tapped hole in a machine part or to receive a nut.

At one side, near the end of the threaded portion of the shank 10, a small recess 14 is drilled through the thread 12 into the shank. The recess 14 preferably terminates short of the axis of the shank so as to remove as small an amount of metal as possible. Within this recess a plug 15 of nylon, or the like, is secured. The plug 15 has a smooth outer surface 16 which is preferably flush with the top of the thread 12 or may extend slightly beyond the top of said thread, but in any event lies above the bottom of the thread so as to be deformed when secured into the outer member.

The recess 14 is shown as formed with a flat bottom wall 20 and the plug 15 has a cooperating flat bottom wall 21 which serves to seat the plug in proper position in the recess. The plug 15 is also shown as provided with a small central axial passage 22 which serves as an air vent to prevent an air pocket from being formed beneath the plug and interfering with the insertion thereof in the recess. The passage 22 also provides expansion space for the material of the plug which is displaced by the engaging threads when the two members are in threaded engagement. The size of the passage 22 should be such that the passage becomes substantially closed when the plug is so deformed by the engaging thread.

The nylon plug may be secured in the shank by the tendency of the nylon to return gradually to its original shape. The nylon may be obtained in the form of a rod which is cast in a size to fit tightly in the recess in the threaded shank, or may be of a diameter which is slightly over-size with respect to the shank recess. To facilitate insertion of the plug in the recess, the end of the nylon rod may be temporarily reduced in diameter by suitable means as by applying external compression by extrusion through a reducing die having a tapered hole, or by rolling the end of the rod between pressure plates. Due to the gradual return of the rod, the reduced end may be inserted in the shank recess and cut at the level of the thread to form the plug insert as shown in Fig. 1 before the stock has had time to expand. After expansion, however, the plug becomes firmly secured to the shank. The rod may be pre-cut to form the individual plugs which are reduced and inserted in the above manner.

A means for further securing the nylon plug in the shank is shown in Fig. 2. In this embodiment the plug 15, which may be of the same size as the recess 14, is inserted in the recess and the ends 45 of the thread 12 on the shank 10 are upset to form fingers which extend into and compress the plug 15, to secure the same in place. This upsetting of the ends 45 of the thread may be effected after the plug has been inserted in the shank and provides a positive mechanical lock for the plug.

It is obvious that the invention applies to any member having an externally threaded shank which is adapted to engage a corresponding internal thread of a mating member. The plug may of course be placed in the internally threaded member instead of in the externally threaded member.

Although specific embodiments of the invention have been shown and described for purposes of illustration, it is to be understood that the invention is capable of various uses and that changes and modifications may be made therein as will be readily apparent to a person skilled in the art.

What is claimed is:

1. A fastener comprising a first element having an integral externally screw-threaded shank adapted to engage a similar internally screw-threaded portion of a second element, said shank having a recess in one side only thereof having a cylindrical side wall and a closed bottom wall and extending into said shank through the threads thereof, and a plug of a deformable material having the property of not acquiring a permanent set, but of returning gradually to its original shape after being deformed, said plug being secured in said recess with its top surface extending above the bottom of said threads so as to be deformed by engagement with the internal thread of said second element for exerting locking pressure thereon, the bottom wall of said recess and the bottom of said plug having engaging portions forming a stop to limit the inward movement of said plug during assembly, the top of said plug being completely covered by said internal thread when said elements are in use, and projections formed on the ends of said external threads which are intersected by said recess, said projections entering the sides of said plug for locking the same in said recess.

2. A fastener comprising a first element having an integral externally screw-threaded shank adapted to engage a similar internally screw-threaded portion of a second element, said shank having a recess in one side only thereof having a cylindrical side wall and a closed bottom wall and extending into said shank through the threads thereof, and a plug of a deformable material having the property of not acquiring a permanent set, but of returning gradually to its original shape after being deformed, said plug having a central axial passage therein forming an air vent during assembly and being secured in said recess with its top surface extending above the bottom of said threads so as to be deformed by engagement with the internal thread of said second element for exerting locking pressure thereon, the bottom wall of said recess and the bottom of said plug having substantially flat engaging portions forming a stop to limit the inward movement of said plug during assembly, said axial recess forming an expansion space adapted to receive the material of said plug when the latter is deformed by said external thread, the top of said plug being completely covered by said internal thread when said elements are in use, and projections formed on the ends of said external threads, which are intersected by said recess, said projections entering the sides of said plug for locking the same in said recess.

3. A fastener comprising a first element comprising a shank having an integral externally screw-threaded surface adapted to engage a similar internally screw-threaded portion of a second element, said shank having a recess in one side only thereof having a cylindrical side wall and a closed bottom wall and extending into said shank through the threads thereof, and a plug of a deformable material having the property of not acquiring a permanent set, but of returning gradually to its original shape after being deformed, said plug being secured in said recess with its top surface extending above the bottom of said threads so as to be deformed by engagement with the internal thread of said second element for exerting locking pressure thereon, the bottom wall of said recess and the bottom of said plug having engaging portions forming a stop to limit the inward movement of said plug during assembly, the top of said plug being completely covered by said internal thread when said elements are in use, and projections formed on said externally threaded surface and extending into said recess, said projection entering the sides of said plug for locking the same in said recess.

LEE N. BRUTUS.

REFERENCES CITED

The following references are of record in the file of this patent:

UNITED STATES PATENTS

| Number | Name | Date |
|---|---|---|
| 1,180,026 | Frood | Apr. 18, 1916 |
| 2,405,088 | Clauson | July 30, 1946 |
| 2,520,121 | Brutus | Aug. 29, 1950 |

FOREIGN PATENTS

| Number | Country | Date |
|---|---|---|
| 496,638 | Great Britain | Dec. 2, 1938 |